United States Patent [19]
Griese

[11] 3,904,957
[45] Sept. 9, 1975

[54] EDDY CURRENT TEST APPARATUS WITH PEAK SIGNAL VALUE STORAGE MEANS

[75] Inventor: Alfons Griese, Rommelsbach, Germany

[73] Assignee: Institut Dr. Friedrich Forster, Prufgeratebau, Reutlingen, Germany

[22] Filed: June 27, 1974

[21] Appl. No.: 483,789

[30] Foreign Application Priority Data
Sept. 29, 1973  Germany............................ 2349046

[52] U.S. Cl. ................................................. 324/40
[51] Int. Cl.² ........................................ G01R 33/12
[58] Field of Search................................ 324/37, 40

[56] References Cited
UNITED STATES PATENTS

| | | | |
|---|---|---|---|
| 3,405,354 | 10/1968 | Callan et al........................... | 324/40 |
| 3,825,820 | 7/1974 | Flaherty et al........................ | 324/37 |
| 3,848,182 | 11/1974 | Gerner et al.......................... | 324/40 |

Primary Examiner—Robert J. Corcoran
Attorney, Agent, or Firm—Ervin B. Steinberg; Philip J. Feig

[57] ABSTRACT

For distinguishing a signal responsive to a defect in a workpiece from a signal responsive to a dimensional change, the eddy current test apparatus is provided with at least two signal storage means and a phase angle comparison means. The X- and Y-component direct current signals of the maximum values obtained from the phase selective circuit are briefly stored in the respective storage means. The ratio of the signals $U_{x\ max}/U_{y\ max} = \tan \alpha_m$ is formed and the resulting angle $\alpha_m$ is compared with a predetermined angle $\beta$. If the angle $\alpha_m$ is greater than angle $\beta$, the stored signal is used to trigger a defect responsive utilization device since this latter condition is indicative that the vector voltage with angle $\alpha_m$ relative to the X- axis on the screen of a cathode ray tube falls into a region normally associated with a defect.

16 Claims, 5 Drawing Figures

3,904,957

EDDY CURRENT TEST APPARATUS WITH PEAK SIGNAL VALUE STORAGE MEANS

BACKGROUND OF THE INVENTION

This invention concerns an apparatus for testing elongated metallic workpiece for defects by the eddy current test method wherein the workpiece is moved relative to a test coil means. The test coil means develops a signal responsive to an anomaly in the workpiece and this signal is fed to a phase selective circuit which provides a set of direct current voltages responsive to the two mutually normal components of the anomaly responsive signal.

Arrangements of this type are known and a typical embodiment is described in U.S. Pat. No. 2,806,992 issued to F. Foerster dated Sept. 17, 1957, entitled "Measuring and Testing Instruments." The two direct current signals produced, hereinafter referred to as X- and Y-signals, generally are applied to the horizontal and vertical deflection plates of a cathode ray tube for providing a luminescent spot on the screen of the tube, the amplitude and phase location of the spot being responsive to the signal produced by the test coil means. As an anomaly in the workpiece moves past the test coil means, the luminescent spot on the screen moves through a curved path beginning at a zero position at the center of the screen and ends at the same position. The curved path, depending on the nature of the anomaly and the construction of the test coil means, may exhibit various forms, however, most frequently the path is that of a numeral eight configuration, see Foerster patent supra.

Threshold means may be used which provide an output signal in binary form when the X- and Y-signals exceed a predetermined amplitude level, hence indicating that a defect sensed is above an acceptable level. The output signal is useable for actuating a color marking device which sprays paint upon the defect area of the workpiece, for activating a defect counter, for marking the chart of a strip chart recorder and the like.

With the arrangements known heretofore it often has been difficult to distinguish signals caused by defects in the workpiece, such as cracks, holes, etc. from those signals which are responsive to dimensional changes, such as diameter changes in rods or tubings. These problems are partially solvable by utilizing the fact that when selecting a favorable test frequency, signals caused by defects are disposed at a different phase angle than those caused by dimensional changes. Hence, it is a common practice to adjust the phase angle of the signals in such a manner that signals responsive to dimensional change fall along the X- or horizontal axis of the cathode ray tube screen while the Y-component is used for controlling the defect threshold circuit. This method, however, is completely successful only if the signal responsive to a dimensional change has no component falling along the Y-axis, i.e. the signal moves solely along the X- or horizontal axis. In practice, however, this is not the case. Rather, the path of the luminescent spot responsive to a dimensional change may at one time have a larger and at another time a smaller inclination with respect to the X-axis, or may show a bulge or may comprise a flat lying numeral eight configuration. All deviations from the ideal horizontally disposed straight line indicate, of course, voltage components in the Y- direction. In the described method the signals which are aligned exclusively along the X-axis can be omitted from defect evaluation. In U.S. Pat. No. 3,405,354 issued to J. M. Callan et al., dated Oct. 8, 1968, entitled "Apparatus for Limiting Phase Angle Response Range" etc., arrangements are described for evaluating signals which fall within a selected angular sector, such sector being disposed symmetrically with respect to the Y-axis. However, in many instances an unequivocal separation of signals responsive to defects from those caused by dimensional changes is not possible since the paths of luminescent spots may be intersecting.

The arrangement disclosed hereafter concerns novel means for separating signals responsive to dimensional changes from those responsive to defects in the workpiece.

A principal object of the present invention, therefore, is the provision of a novel and improved eddy current test system for metallic workpieces, which system includes means for accurately and unequivocally distinguishing between actual defects and dimensional changes in the workpieces.

Another important object of this invention is the provision of an improved eddy current test system which includes electrical circuit means for accurately distinguishing signals responsive to defects in a workpiece from those caused by dimensional changes.

A further object of this invention is the provision of an eddy current test system which includes means for automatically distinguishing signals caused by defects in a workpiece from those caused by non-objectionable dimensional changes.

Other and still further objects of this invention will be more clearly apparent from the following description when taken in conjunction with the accompanying drawings.

DETAILED DESCRIPTION OF THE INVENTION

Figure 1:
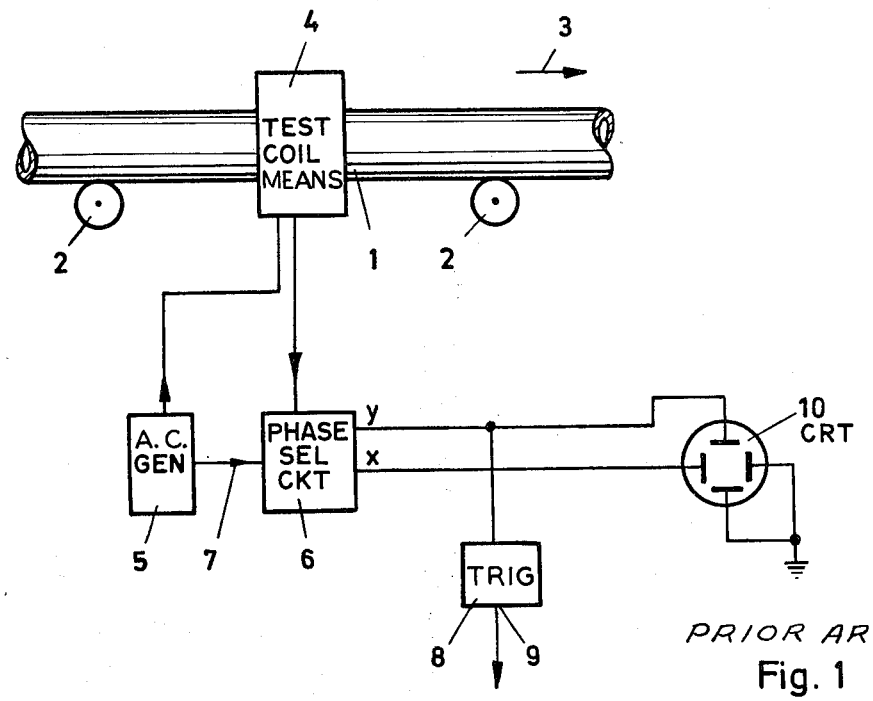
FIG. 1 is a schematic block diagram of an apparatus in accordance with the prior art.

FIG. 1 discloses schematically an arrangement for testing elongated metallic workpieces in accordance with the art described heretofore. A workpiece 1, for instance a tubing, is moved by transport means 2 along the direction indicated by arrow 3 through a test coil means 4. An alternating current source 5 energizes the coil means 4 and the resulting alternating current flowing through the coil means produces in the workpiece the necessary alternating magnetic field which causes the flow of eddy currents in the workpiece 1. The coil means 4 may comprise a set of differential sensing coils for comparing the eddy currents present in two adjoining portions of the workpiece 1. In the event that these portions are homogeneous the effects caused by the eddy currents and appearing as voltages across the individual coils of the differential sensing coils cancel each other. However, an anomaly passing through the coil means 4 causes a signal to be present across the sensing coils. The output from the coil means is coupled to a phase selective circuit 6 which, in a preferred embodiment, is the same as that shown in U.S. Pat. No. 2,806,992, supra, see FIG. 5 reference numeral 39. This circuit produces from the two normal components of the signal voltage a pair of always proportional direct current signals, hereinafter referred to as X-signal and Y-signal. The necessary control voltage providing a known reference phase angle is supplied from the alternating current source 5 via conductor 7. The Y-signal is coupled to the input of a trigger circuit 8 which produces at its output 9 an output signal in binary form whenever the Y-signal exceeds a predetermined amplitude. The occurrence of a binary signal at the output 9 indicates the existence of an anomaly and may be utilized for marking the defect area, for counting or registering defects, etc. The Y-signal is coupled, moreover, to the vertical deflection plates and the X-signal to the horizontal plates of a cathode ray tube 10 to provide for a deflection of the luminescent spot from the center of the screen responsive to the magnitude and polarity of the X- and Y-signals.

Figure 2:
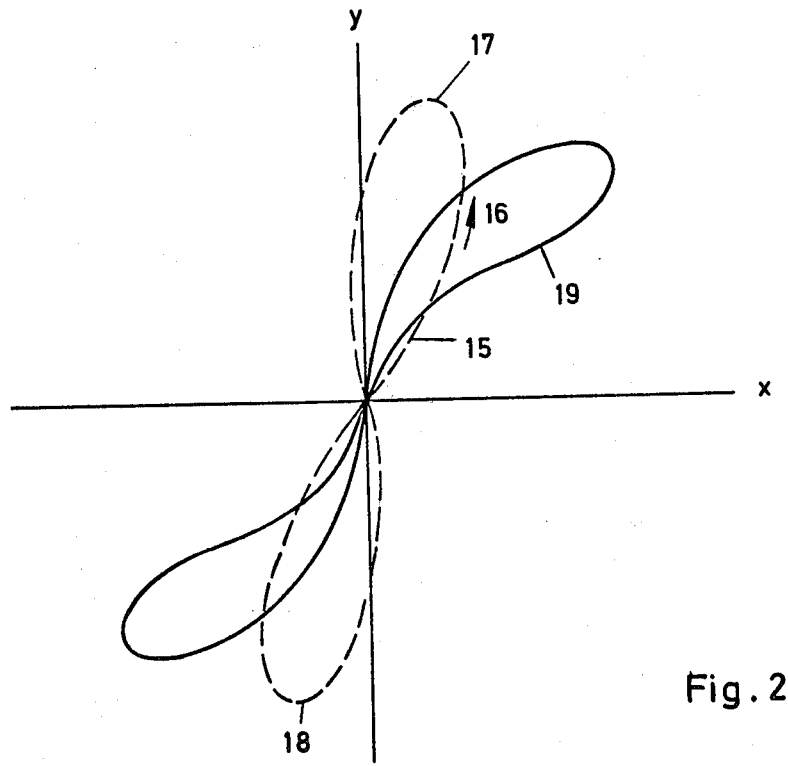
FIG. 2 is a plot of the path of a luminescent spot on the cathode ray tube screen responsive to a defect and a dimensional change.

FIG. 2 depicts two typical paths of the luminous spot when an anomaly in the workpiece 1 passes through the coil means 4. The path 15 corresponds to a pore errupting through the surface of the workpiece. This type of defect is considered serious and must be indicated. The spot starts its configuration eight like path at the center of the screen, advances in the direction of arrow 16 to the first direction reversal point 17, passes then through the center of the screen to the second direction reversal point 18 and then returns to the center of the screen. The reversal points 17 and 18 corespond to the condition when the pore is disposed approximately in the maximum of the excitation flux and is sensed by the first and second half respectively of the differential coil assembly. The zero point disposed between both reversal points corresponds to the position of the pore when its effect causes cancellation of the voltages provided across both differential coil halves. The path 19 corresponds to a dimensional change in the workpiece which irregularity is not to be considered a defect and which condition shall not be registered by the trigger circuit.

To suppress, in accordance with the heretofore known test technique, the effects of a dimensional change, it has been the practice to vary the reference phase of the control signal of the phase selective circuit in such a manner, specifically by rotating the path followed by the luminescent spot, that the path responsive to a dimensional change of the workpiece will predominantly be along the X- axis. Since the trigger circuit is supplied only with the Y-signals, it frequently has been possible to suppress indications of dimensional changes without seriously impairing the Y-component of signals denoting an actual defect. In many instances, however, as shown for instance in FIG. 2, the path of the luminescent spot resulting from a dimensional change is characterized by a bowed path of considerable width so that even after optimum phase rotation there still remains a relatively large Y-component which is responsive to the dimensional change.

Figure 3:
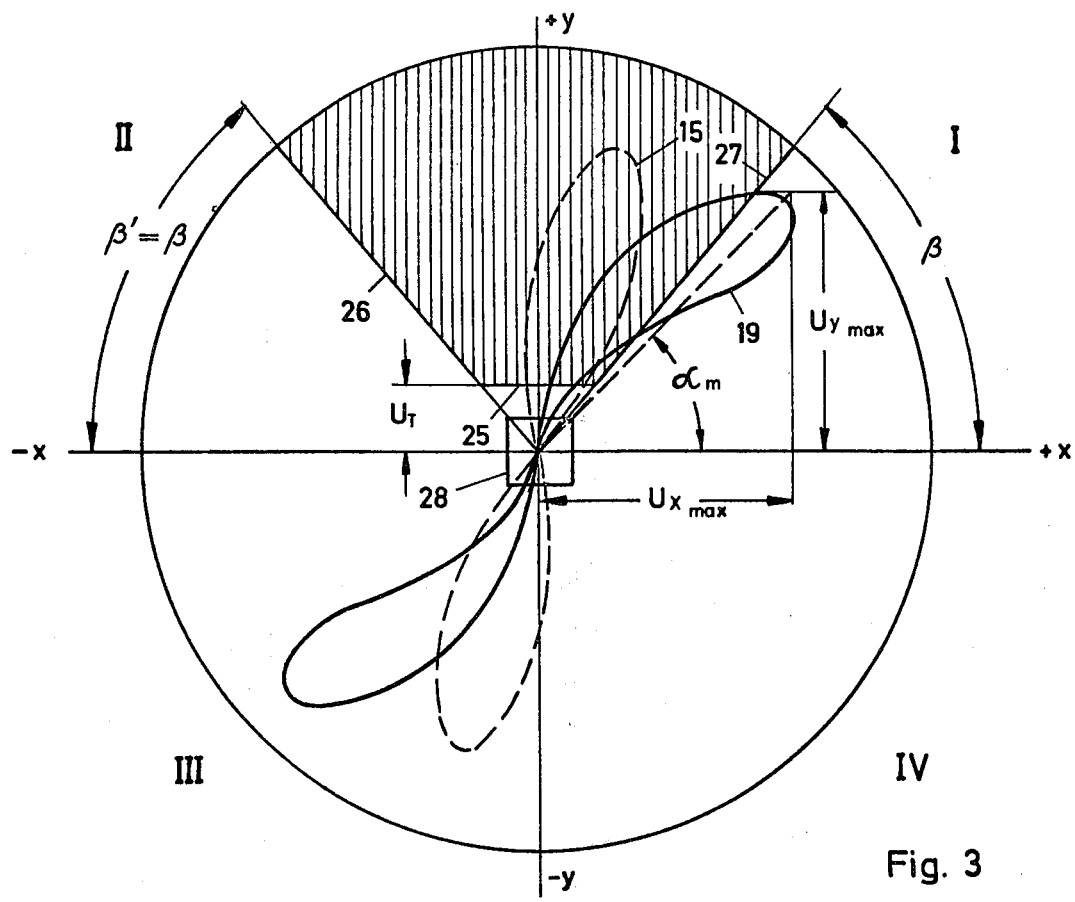
FIG. 3 is a plot disclosing the evaluating of the information developed per FIG. 2.

A solution to the problem explained hereinabove involving a novel approach for separating signals pertaining to dimensional changes from those pertaining to defects will be more clearly apparent by reference to the example selected per FIG. 2. FIG. 3 shows once more the paths 15 and 19 of the luminescent spot per FIG. 2. Line 25 indicates the trigger threshold voltage $U_T$ which must be exceeded by the positive Y-signal in order to cause a defect indication. Two further limit lines 26 and 27 are provided which radially extend from the center of the screen and which form with the positive and the negative portion of the X-axis an angle $\beta$ and angle $\beta'$ respectively. Both angles are arbitrarily selected and are assumed, in the present example, to be equal. The lines 25, 26 and 27 delineate a shaded area which will be discussed hereinafter.

The square area 28, at the origin of the display, may be termed a zero field. This square area 28 serves for fixing the point in time when the path of the luminescent spot can be considered terminated. The four quadrants of the screen of the cathode ray tube are designated in FIG. 3 by the Roman numerals I to IV.

As the luminescent spot moves across the upper half of the screen, there are provided in sequence the maximum value of the X-signal, $U_{x\ max}$, and the maximum value of Y-signal, $U_{y\ max}$. Since both values are not available simultaneously, it is necessary to store them temporarily. Since the equation $\tan \alpha_m = U_{y\ max}/U_{x\ max}$ determines the angle $\alpha_m$, a logic circuit is used for ascertaining whether the angle $\alpha_m$ is larger or smaller than the previously selected angle $\beta$. If angle $\alpha_m$ is larger than angle $\beta$, a defect responsive signal to be evaluated is present. In this event, the stored signal $U_{y\ max}$ is coupled by means of a gate circuit to the input of a trigger circuit which is provided with the threshold voltage $U_T$. If the threshold voltage $U_T$ is less than the voltage $U_{y\ max}$ a defect indicating output signal is produced at the output of the trigger circuit. If, however, the angle $\alpha_m$ is smaller than the angle $\beta$, a signal indicative of a dimensional change is present. The stored voltage $U_{y\ max}$ is not applied to the input of the trigger circuit. Therefore, no trigger output signal is obtained even in the evvent that the signal $U_{y\ max}$ is considerably higher than the threshold voltage $U_T$.

The lines 25, 26 and 27 delineate a shaded region whose area is variable since the trigger threshold voltage $U_T$ as well as angles $\beta$ and $\beta'$ are selectable. An anomaly responsive signal always will be considered a defect responsive signal if the path of its luminescent spot at least partially passes within the shaded area and if at the same time the angle $\alpha_m$ is larger than the angle $\beta$.

From the discussion heretofore it will be readily apparent that an arrangement using circuit means described above constitutes a significant advance in the art. Despite the fact that the paths 15 and 19 intersect with one another inside the shaded region, it is possible to achieve a clear separation of the beam path 15 responsive to a defect from the path 19 responsive to a dimensional change of the workpiece.

Figure 4:
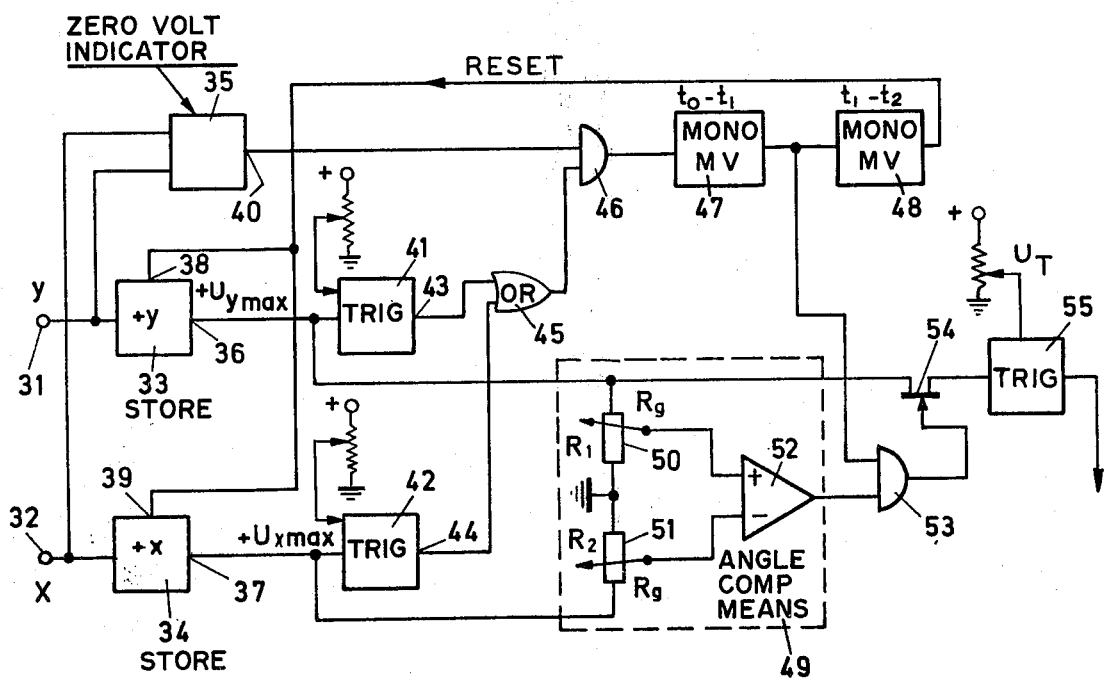
FIG. 4 is a schematic block circuit diagram of a simple embodiment of a test apparatus in accordance with the present invention.

Description of Circuit FIG. 4

FIG. 4 discloses a partial schematic block diagram of an arrangement in accordance with the present invention in its simplest embodiment. The terminals 31 and 32 correspond to both output terminals of the phase selective circuit per FIG. 1 and provide the X- and Y-signals. These terminals are coupled to the inputs of two analog storage means 33 and 34, such as peak detector and storage circuits, and are coupled, moreover, to both inputs of a zero voltage indicator 35. Both storage means 33 and 34 should be responsive only to positive voltages at their inputs and store the peak voltage values +$U_{x\ max}$ and +$U_{y\ max}$ at the outputs 36 and 37. As soon as a reset signal is received at the reset inputs 38 and 39, the storage means 33 and 34 are reset. The zero voltage indicator 35 is adapted to determine whether the X-signal and Y-signal are within the confines of the zero field 28 of FIG. 3. A logic level output signal 1 is provided at the output 40 of the zero voltage indicator 35 as soon as the signals are within the region of the zero field 28. Two triger circuits 41 and 42 are coupled to the outputs 36 and 37 of the storage means 33 and 34 and the threshold level signal amplitude applied to the trigger circuits corresponds to the limits of the zero field 28. A logic level signal 1 is present at the outputs of trigger circuits 41 and 42 if the stored voltage exceeds the zero field level amplitude. An OR gate circuit 45 is coupled to the outputs 43 and 44 of the trigger circuits 41 and 42. The output of the OR gate circuit 45 and the output 40 of the zero voltage indicator 35 are coupled to the input of an AND circuit 46. A monostable multivibrator 47 receives an output logic level 1 signal from the AND circuit 46 at the time $t_o$. Responsive to the output signal from the AND circuit 46 at time $t_o$, the output signal of the monostable multivibrator 47 assumes the logic level 1 state and remains in that state until the time $t_1$. A further monostable multivibrator 48, coupled to the monostable multivibrator 47, serves as a zeroizing circuit. Its reset signal is generated at time $t_1$ responsive to the trailing edge of the signal from the multivibrator 47 and such reset signal is maintained until time $t_2$. During this time interval the storage means 33 and 34 are reset.

The outputs 36 and 37 of the storage means 33 and 34 are coupled, furthermore, to the inputs of an angle comparison means 49 which serves for the purpose of comparing the angles $\alpha m$ and $\beta$ with one another. The angle comparison means 49 comprises two potentiometers 50 and 51 and an operational amplifier 52. Each potentiometer has one end connected to ground while the respective other ends are coupled for receiving the signals $U_{y\ max}$ and $U_{x\ max}$ respectively. The sliding contacts of the potentiometers are coupled respectively to the non-inverting and to the inverting inputs of the operational amplifier 52. Assuming that each of the potentiometers has a total resistance Rg and that the respective resistances adjusted between the sliding contacts and ground exhibit a value of R1 and R2, the ratio conditions provided by the potentiometers 50 and 51 will be:

$$A_1 = R1/Rg \text{ and } A_2 = R2/Rg.$$

Since amplifier 52 is a high gain differential amplifier, it functions in the manner of a comparator. That is, the output of amplifier 52 is either in its high or its low state responsive to the magnitude of the signals at the inverting and non-inverting inputs of the amplifier 52. The output will be substantially equal to the positive power supply when the signal at the non-inverting input is more positive than the signal at the inverting input. The output will be substantially equal to the negative power supply when the signal at the non-inverting input is less positive than the signal at the inverting input.

The limiting condition occurs when the two inputs are of equal magnitude, that is $$A_1 U_{ymax} = A_2 U_{xmax}$$

or $$\frac{U_{ymax}}{U_{xmax}} = \frac{A_2}{A_1} = \frac{R2}{R1} = \tan \alpha_m$$

To evaluate a signal within the shaded area of FIG. 3, the angle $\alpha_m$ must at least equal the angle $\beta$ and $\tan\alpha_m = \tan\beta$. Thus for the limiting condition, defining the line 27, $$\tan\beta = A_2/A_1 = R2/R1$$

As described above, a positive output signal will appear at the output of the amplifier 52 when the value of $\tan\alpha_m$ (which equals $U_{ymax}/U_{xmax}$) is larger than the value of $\tan\beta$ (as determined by the adjustment of the potentiometers 50 and 51), and a negative output signal will appear when $\tan\alpha_m$ is smaller than $\tan\beta$.

It is apparent that by varying the resistance R1 and R2 the angle $\beta$ may be varied. For example, if only a predetermined range of angle $\beta$ is desired, one of the resistor divider rations may be constant, e.g. $A_2 = \frac{1}{2}$. The resistance ration ($A_1$) of resistor 50 when varied through the range from zero to unity causes the angle $\beta$ to change from 26.5° to 90°. If the angle $\beta$ equal to zero degrees is desired, the potentiometer 51 must be variable so that when the ratio $A_2$ equals zero, the angle $\beta$ will be zero degrees.

The outputs of the operational amplifier 52 and of the monostable multivibrator 47 are coupled to the input of an AND gate circuit 53. The output signal provided by the AND circuit 53 is coupled to the gate of a field effect transistor 54 which serves as a switch for coupling the output signal of the storage means 33, signal $U_{y\ max}$, to the input of a trigger circuit 55. Trigger circuit 55 corresponds to the trigger circuit numeral 8 shown in FIG. 1.

Since the maximum values of the voltages along the X- and Y-direction must be measured, it must be ascertained that during measurement the maxima are actually achieved. To accomplish this, two conditions must be met:

1. At least one of the stored values $U_y$ or $U_x$ should be greater than the zero field 28, and
2. The luminescent spot should have returned into the zero field 28.

The AND circuit 46 is used to determine whether both conditions are met. As soon as a voltage is present on one or both of the outputs 36 or 37 which exceeds the limits of the zero field 28, a logic level signal 1 is applied via trigger circuit 41 or 42 and via the OR circuit 45 to the input of the AND circuit 46. This signal path indicates that the spot has met the first of the above stated conditions. The second condition is indicated by the zero voltage indicator 35 which provides at its output 40, and hence at the other input of the AND circuit 46, a logic level 1 signal only when the luminescent spot returns into the zero field 28. If both conditions are met simultaneously, the monostable multivibrator 47 is triggered and provides a logic level 1 signal to one input of the AND circuit 53 during the time interval from $t_o$ to $t_1$. Meanwhile the angle comparison means 49 determines whether the angle $\alpha_m$ is greater than the preselected angle $\beta$. If this is the case, the output of the AND circuit 53 becomes a logic level 1 signal and, hence, the stored signal $U_{y\ max}$ is coupled via field effect transistor 54 to the input of the trigger circuit 55. An output voltage provided by the trigger circuit 55 denotes a defect if the value of $U_{y\ max}$ is larger than the trigger threshold value $U_T$.

In the example per FIG. 3, the separation of defects from dimensional changes has been shown for only the upper half of the luminescent spot path, i.e. for the upper screen half. In the embodiment per FIG. 4, signal evaluation has been demonstrated only for the first quadrant of the screen in lieu of the other quadrants.

In practice it has been found that evaluation of the upper screen half is sufficient in almost all cases. Nevertheless, it is basically possible, without difficulty, to extend the teachings heretofore to all four quadrants of the screen. In this latter case a new possibility presents itself for indicating anomalies in the workpiece on the cathode ray tube screen.

If the X- and Y-signals are not applied to the horizontal and vertical deflection plates of the cathode ray tube as done heretofore, but provided only during a predetermined time interval, then both stored voltage signals $U_{x\ max}$ and $U_{y\ max}$ are coupled to these plates and each light spot path resulting from an anomaly in the workpiece, irrespective of whether the anomaly is a crack, hole or thickness variation, assumes a straight line. Such a path originates in the center of the screen and is characterized by its length and angle $\alpha_m$ which it forms with respect to the X-axis.

The present embodiment has certain advantages for adjusting the test apparatus. If the shaded region of the screen is delineated approximately as shown in FIG. 3, the reference phase angle can be adjusted readily so that all straight lines which are not responsive to defects lie outside of the shaded region, whereas all straight lines responsive to defects are disposed within the shaded region.

Figure 5:
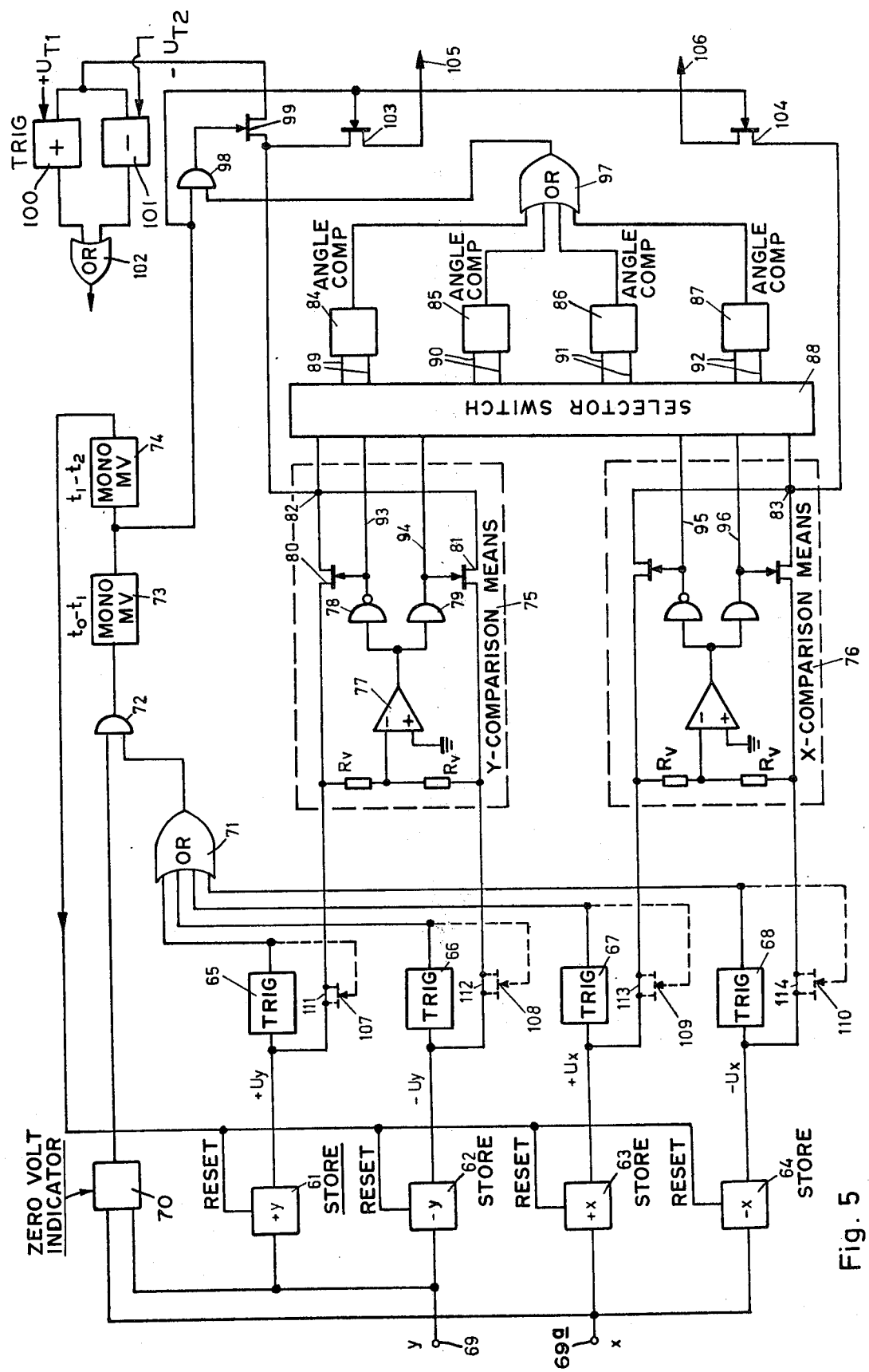
FIG. 5 is a schematic block circuit diagram of an alternative embodiment of an eddy current test apparatus in accordance with the present invention.

Description of Circuit per FIG. 5

FIG. 5 is a portion of a block circuit diagram disclosing an embodiment which, in accordance with the present invention, provides for an evaluation of all four quadrants and which provides, moreover, for the improved presentation mentioned hereinabove. In contrast with the circuit per FIG. 4, this circuit provides a respective analog signal storage means 61, 62, 63 and 64 for the maximum values along the four axial directions, that is for $+U_x$, $-U_x$, $+U_y$ and $-U_y$. Also, the circuit includes an associated trigger circuit 65, 66, 67 and 68 coupled to each signal storage means, each trigger circuit being adjusted for a threshold value determined by the zero field 28. The inputs of both Y-storage means 61 and 62 as well as the inputs of both X-storage means 63 and 64 are coupled via the terminals 69 and 69A to the Y- and X-outputs of the phase selective circuit as described in connection with FIG. 1. The same terminals are coupled to the inputs of the zero voltage indicator 70, which corresponds to the previously described zero indicator. The output of the zero voltage indicator 70 and the output of the OR gate circuit 71, whose four inputs are coupled to the outputs of the trigger circuits 65 to 68, are connected to the inputs of an AND circuit 72. The output of the AND circuit 72 is coupled to the input of a monostable multivibrator 73. The output of the monostable multivibrator 73 is coupled to a monostable multivibrator 74. The output of monostable multivibrator 74 provides a reset signal for operating the reset input of the storage means 61, 62, 63 and 64. Functionally, both multivibrators 73 and 74 correspond with the heretofore described components 47 and 48 FIG. 4. Two comparison means, the Y-comparison means 75 and the X-comparison means 76, are provided for deciding whether the stored positive or negative maximum value of $U_y$ or $U_x$ is to be selected. Naturally, it must be the value whose magnitude is larger. Since the Y-comparison means 75 and the X-comparison means 76 are of identical construction, only the former will be described in detail. The stored positive and the negative voltages $+U_y$ and $-U_y$ are coupled via two resistors $R_r$ of equal magnitude to the inverting input of an operational amplifier 77 whose non-inverting input is grounded. The output of the amplifier 77 is coupled to the inputs of an inverting gate circuit 78 and of a non-inverting gate circuit 79. The outputs from both circuits 78 and 79 control the gate of field effect transistors 80 and 81 which cause either the stored positive signal $+U_y$ or the stored negative signal $-U_y$ to be coupled to the output 82 of the Y-comparison means 75.

The operation of both comparison means 75 and 76 will now be described. If at the input of the comparison means the amplitude of the stored positive voltage $+U_y$ is greater than the value of $-U_y$, a negative voltage will exist at the output of the operational amplifier 77. The amplitude of the output voltage is approximately the negative power supply voltage because the high gain drives the amplifier to saturation. Conversely, if the $-U_y$ signal prevails, a peak positive signal will be present at the output of the operational amplifier 77. A negative input signal at the gates 78 and 79 results in a 1 logic signal at the output of the inverting gate 78 and a logic line 0-signal at the output of the non-inverting gate 79. Conversely, a positive input voltage at the gates 78 and 79 causes a logic level 0-signal at the output of the gate 78 and a logic level 1 signal at the output of the gate 79. Hence, a logic level 1 signal is coupled to only the gate of the field effect transistor 80 or to the gate of the transistor 81 and thereby couples either the signal $+U_y$ to the output 82 when $+U_y$ assumes a larger amplitude than $-U_y$, or couples the signal $-U_y$ to the output 82 in the case when the signal $-U_y$ assumes the larger amplitude.

Since signals are to be evaluated in all four quadrants of the screen, four angle comparison means 84, 85, 86 and 87 are provided which in construction and operation may correspond with the angle comparison means 49 per FIG. 4, each having means for adjusting the limiting angle $\beta$. A selector switch 88 serves for coupling the stored voltages $U_x$ and $U_y$, available at the terminals 82 and 83, to a pair of input terminals of the angle comparison means associated with a respective quadrant. In order to establish such connection, the selector switch 88 has its input coupled to terminals 82 and 83 and its output coupled to the pairs of input terminals 89, 90, 91 and 92 of the angle comparison means 84, 85 86 and 87. The selector switch 88 comprises a logic switching circuit which receives its switching signals from the gates 78 and 79 of the Y-comparison means 75 via conductors 93 and 94, as well as via conductors 95 and 96 from the corresponding terminals of the X-comparison means. The signal conducted by conductors 93, 94, 95 and 96 has the necessary information concerning the polarity of the stored peak signals $U_y$ $_{max}$ and $U_{x\ max}$ for proper selection of the angle comparison means.

The outputs of the angle comparison means 84 to 87 are coupled respectively to the four inputs of an OR circuit 97. The output of the OR circuit 97 and the output of the monostable multivibrator 73 are coupled to the inputs of an AND circuit 98 whose output signal controls a field effect transistor 99. The stored signal $U_y$ from terminal 82 can be coupled via the transistor 99 to the parallel coupled inputs of a trigger circuit 100 having a positive threshold voltage $+U_{T1}$ and to a trigger circuit 101 having a negative threshold voltage $-U_{T2}$. The output signals from both trigger circuits 100 and 101 are coupled to the inputs of an OR circuit 102 and may be utilized for controlling a color marking device, a counter or a recording means.

The stored voltages $U_{y\ max}$ and $U_{x\ max}$ can be coupled by means of the two field effect transistors 103 and 104 from the terminals 82 and 83 to the output conductors 105 and 106 and from there to the vertical and horizontal deflection plates of a cathode ray tube. The gates of the transistors 103 and 104 are connected jointly to the output of the monostable multivibrator 73.

Additionally, four further field effect transistors 107 to 110 (shown by dashed lines) may be provided which are then inserted into the circuit at locations 111 to 114 between the outputs from the storage means 61 and 64 and the pairs of input terminals of both comparison means 75 and 76. The respective gates of the transistors are connected to the respective outputs of the associated trigger circuits 65 to 68. The field effect transistors 107 to 110 permit the applicable stored signal to be conducted further, as explained hereinabove, only if the threshold value of the associated trigger circuit is exceeded, that is, operation is outside the zero field 28. This arrangement avoids the possibility of recording minor defect indications within the region of the zero field 28. This possibility could arise from the condition when the peak values of noise signals occurring within the region of the zero field 28 are detected and stored in the storage means for a period of time until a luminescent spot has departed from the zero field 28 and has subsequently returned into the zero field.

The conditions for assuring that all maxima are exceeded for the evaluation time remain the same as the ones described previously in conjunction with the embodiment per FIG. 4. However, in the present instance four stored values are involved which are controlled by the OR gate 71. A logic level 1 signal at the output of the OR gate 71 indicates that a voltage exceeding the zero field 28 is present in at least one of the storage means 61 to 64 and if simultaneously the zero indicator 70 indicates by virtue of a logic level 1 signal at its output that the luminescent spot has returned into the region of the zero field 28, the evaluation of the stored signals $U_{y\ max}$ and $U_{x\ max}$ begins at the time $t_o$ responsive to the triggering of the monostable multivibrator 73. During the interval in which the luminescent spot is disposed outside the zero field 28, the voltages at the outputs 82 and 83 of the Y- and X-comparison means 75 and 76 as well as those of the angle comparison means 84 to 87 may undergo several changes. Similarly, during the same interval the condition of the conductors 93 to 96 affecting the switch 88 may change. These changes, however, are of no significance since shortly prior to the entry of the spot into the zero field 28 the final and correct signals have been adjusted.

The occurrences at approximately the time when the luminescent spot returns into the zero field 28 will now be examined by means of an example. It is assumed for the present purpose that both Y-storage means 61 and 62 as well as the negative X-storage means 64 have signals which exceed the threshold level of trigger circuits 65, 66 and 68. Since both Y-storage means 61 and 62 have signals which exceed the zero field 28, the Y-comparison means must determine which amplitude $+U_{y\ max}$ or the amplitude $-U_{y\ max}$ is the greater. Assuming that the value $+U_{y\ max}$ is the greater one, a negative voltage appears at the output of the operational amplifier 77. This condition causes a logic level 1 signal at the output of gate 78 and conductor 93; and a logic level 0 signal output of gate 79 and conductor 94. The field effect transistor 80 is rendered conductive whereas the field effect transistor 81 is in its blocking condition. In the same manner, a logic level 1 signal is obtained at the X-comparison means 76 and conductor 96. Hence, the voltage $+U_{y\ max}$ exists at terminal 82 and the voltage $-U_{x\ max}$ at terminal 83. Hence, the signal belongs in the second quadrant and must be evaluated by the second quadrant angle comparison means 85. Based upon the information provided by conductors 93 to 96, selector switch 88 connects the terminals 82 and 83 with the pair of input terminals 90 of the angle comparison means 85. If it is assumed further that because of the preselected adjustment of the potentiometer of the angle comparison means 85 full positive voltage is available at the output of the operational amplifier, that is angle $\alpha_m$ is larger than angle $\beta$, a logic level 1 signal is present at the output of the OR circuit 97. During the time interval $t_o$ to $t_1$ a logic level 1 signal is present at both inputs of the AND circuit 98 and such signals cause the stored voltage $+U_{y\ max}$ to be applied via the field effect transistor 99 to both trigger circuits 100 and 101. If the voltage $+U_{y\ max}$ is larger than the threshold voltage $+U_{T1}$ applied to trigger circuit 100, a logic level 1 signal appears at the output of trigger circuit 100 and at the output of the OR gate circuit 102, which condition denotes the presence of an nonacceptable defect. In a similar manner, a large stored negative voltage $-U_{y\ max}$ would be manifest at the output of gate 102 by means of the trigger circuit 101.

Also, during the interval from time $t_o$ to $t_1$ the stored voltages $+U_{y\ max}$ and $-U_{x\ max}$ are applied via transistors 103 and 104 to the output conductors 105 and 106 which can be coupled to both coordinate deflection systems of a cathode ray tube display.

At the time $t_1$ the output of the monostable multivibrator 73 returns to a logic level 0 state. By means of the field effect transistor 99 both trigger circuits 100 and 101, and by means of field effect transistors 103 and 104 both outputs 105 and 106 are disconnected from the stored voltage. The trailing edge of the output pulse of the monostable multivibrator 73 triggers the monostable multivibrator of the zeroizing generator 74, causing a zeroizing signal to occur during the time interval $t_1$ to $t_2$, which signal causes resetting of the storage means 61 to 64 to their zero value. A subsequent defect causes a repetition of the hereinabove described sequences. In the foregoing example, spots are shown on the screen rather than lines. By means of additional electronic devices it is possible to write lines instead of spots. In order to enhance the brightness of the lines, buffer storage means can be used to lengthen the time interval available for writing the lines. This arrangement is quite acceptable since in practice, when testing a workpiece, one defect rarely is succeeded immediately by another defect. However, it is advisable for such testing to select a cathode ray tube screen having a long persistence, i.e. a storage tube.

In accordance with the present embodiment, occurrences which take place in the zero field 28 are not displayed on the screen. However, if spurious signals and other phenomena taking place in the zero field are to be shown, it will be possible to apply the non-stored signals directly to the deflection plates during the time interval prior to the luminescent spot leaving the zero field.

At the moment when the zero field 28 is exceeded, it is possible to switch to the stored signal and upon the spot re-entering the zero field to switch back to the non-stored signal. The switching means necessary for the described switching operation can be controlled by the output from the zero voltage indicators.

What is claimed is:

1. An eddy current test apparatus for an elongated metallic workpiece comprising:
   test coil means connected to a source of alternating current for inducing eddy currents in a workpiece portion under test and for providing in response to relative motion between said coil means and workpiece an anomaly responsive output signal whose amplitude and phase angle is responsive to the anomaly in the workpiece portion;
   phase selective means including rectifying means coupled for receiving said anomaly responsive output signal and producing a pair of direct current signals responsive to the two mutually normal components of said anomaly responsive output signal;
   at least a pair of storage means, each coupled for receiving and storing the peak value of one of said direct current signals, and
   comparison means coupled to said storage means for receiving said stored peak values and comparing the ratio of said peak values with respect to a predetermined value.

2. An eddy current test apparatus as set forth in claim 1, and means coupled to said comparison means for producing a logic level signal when the ratio of said stored peak values exceeds said predetermined value.

3. An eddy current test apparatus as set forth in claim 2, and switching means coupled to said comparison means for coupling at least one of the stored peak value signals to the input of a trigger circuit when said logic signal is produced.

4. An eddy current test apparatus as set forth in claim 3, and including timing means coupled to said switching means for providing a signal defining a predetermined time interval during which said switching means couples at least one of the stored peak value signals to the input of said trigger circuit in response to the existence of said logic signal.

5. An eddy current test apparatus as set forth in claim 4, and zeroizing means coupled in circuit with said timing means for resetting said storage means at the end of said interval.

6. An eddy current test apparatus as set forth in claim 4, and means coupled in circuit with said timing means for causing said timing means to start said time interval responsive to said direct current signals having reassumed a value substantially equal to that of an anomaly free workpiece portion and concurrently at least one of said storage means having stored a signal whose value exceeds a predetermined threshold value.

7. An eddy current test apparatus as set forth in claim 6, said means coupled in circuit with said timing means including zero voltage indicating means coupled in circuit with said direct current signals for determining the condition when both direct current signals fall below a predetermined threshold value selected to be near zero volts.

8. An eddy current test apparatus as set forth in claim 6, said means coupled in circuit with said timing means including further trigger circuit means coupled in circuit with each of the storage means for providing a respective output signal when the associated storage means stores a signal which exceeds a second predetermined threshold value.

9. An eddy current test apparatus as set forth in claim 8, said predetermined threshold value selected to be near zero volts being substantially equal to said second predetermined threshold value.

10. An eddy current test apparatus as set forth in claim 8, said means coupled in circuit with said timing means including gate circuit means coupled in circuit with the output from said zero voltage indicating means and said further trigger circuit means for causing said timing means to start said predetermined time interval responsive to said pair of direct current signals falling below said predetermined threshold value and concurrently at least one of said storage means having stored a signal whose value exceeds said second predetermined threshold value.

11. An eddy current test apparatus as set forth in claim 10, and including a pair of additional comparison means coupled to said storage means for receiving from said storage means the positive and negative peak values of said respective direct current signals stored and for determining the polarity of the larger one of the stored signals and for causing corresponding logic signals at the output of each of said additional comparison means.

12. An eddy current test apparatus as set forth in claim 11, and including a selector switch coupled to said additional comparison means and said storage means, and including furthermore four angle comparison means coupled to said selector switch, said selector switch causing a respective output of one of said additional comparison means to be coupled to one of said angle comparison means for receiving the signal from a respective storage means responsive to the signals at the output of said additional comparison means.

13. An eddy current test apparatus as set forth in claim 1, said comparison means comprising a pair of potentiometers which receive at their input the respective stored values of said direct current signals and including moreover a differential amplifier having an inverting and a non-inverting input coupled for receiving the respective output signals from said potentiometers.

14. An eddy current test apparatus as set forth in claim 1, and means for coupling the peak values of said direct current signals to the deflection systems of a cathode ray tube.

15. An eddy current test apparatus as set forth in claim 14, said means for coupling including a pair of field effect transistors controlled by timing means, said latter means providing a signal for a predetermined time interval during which interval said peak values are coupled to said deflection systems.

16. An eddy current test apparatus as set forth in claim 1, said storage means including means for storing separately positive and negative peak values of said direct current signals.

* * * * *